United States Patent [19]
van der Lely et al.

[11] 4,415,039
[45] Nov. 15, 1983

[54] SOIL CULTIVATING IMPLEMENTS

[75] Inventors: Ary van der Lely, Maasland; Cornelis J. G. Bom, Rozenburg, both of Netherlands

[73] Assignee: C. van der Lely N.W., Maasland, Netherlands

[21] Appl. No.: 239,973

[22] Filed: Mar. 3, 1981

[30] Foreign Application Priority Data

Mar. 3, 1980 [NL] Netherlands .................. 8001263

[51] Int. Cl.³ .................... A01B 23/04; A01B 33/06; A01B 59/043
[52] U.S. Cl. ..................................... 172/47; 172/311
[58] Field of Search ............... 172/47, 311, 456, 446, 172/662, 776, 59

[56] References Cited

U.S. PATENT DOCUMENTS

| | | | |
|---|---|---|---|
| 2,731,901 | 1/1956 | Tye | 172/311 |
| 3,658,361 | 4/1972 | Van Wyk | 172/446 X |
| 3,680,648 | 8/1972 | Tonsfeldt | 172/456 X |
| 3,713,495 | 1/1973 | Redford | 172/456 |
| 3,774,693 | 11/1973 | Orthman | 172/311 |
| 3,887,016 | 6/1975 | Hansen | 172/311 |
| 4,074,766 | 2/1978 | Orthman | 172/311 |
| 4,173,260 | 11/1979 | Lely et al. | 172/311 X |

FOREIGN PATENT DOCUMENTS

| | | | |
|---|---|---|---|
| 198047 | 11/1957 | Austria | 172/456 |
| 730428 | 3/1966 | Canada | 172/456 |
| 2629042 | 1/1977 | Fed. Rep. of Germany | 172/456 |
| 27516 | 2/1955 | Finland | 172/456 |
| 1042071 | 6/1953 | France | 172/456 |
| 1436446 | 3/1966 | France | 172/456 |
| 424522 | 9/1974 | U.S.S.R. | 172/662 |
| 487602 | 1/1976 | U.S.S.R. | 172/456 |
| 719525 | 3/1980 | U.S.S.R. | 172/311 |

*Primary Examiner*—Paul E. Shapiro
*Attorney, Agent, or Firm*—Mason, Mason & Albright

[57] ABSTRACT

A soil cultivating implement has a central frame part that extends substantially horizontally perpendicular to the direction of operative travel of the implement, the frame part has lateral arms tiltably connected to its opposite ends about pivot pins which extend in the direction of travel. Each lateral arm has a corresponding group of power drivable rotary soil working members indirectly connected to it and, a strong but simple frame which resists the high operating forces without deformation. The inner ends of the arms are each held between respective spaced apart cheek plates so as to be surrounded on three sides by those two cheek plates and by a respective connecting piece that rigidly couples the pair of cheek plates to one another beneath the corresponding arm. Each arm is tiltable upwardly and downwardly about the axis of the corresponding pivot pin by a hydraulic piston and cylinder assembly and when tilting the arms upwardly, the effective working width of the implement can be greatly reduced in its inoperative transport position. The central frame part and the two lateral arms constitute a single carrier which is connectible to a prime mover vehicle. The carrier is in advance of the rotary soil working members and has side wheels which can be adjusted. The rear of the implement can be supported by a roller.

9 Claims, 5 Drawing Figures

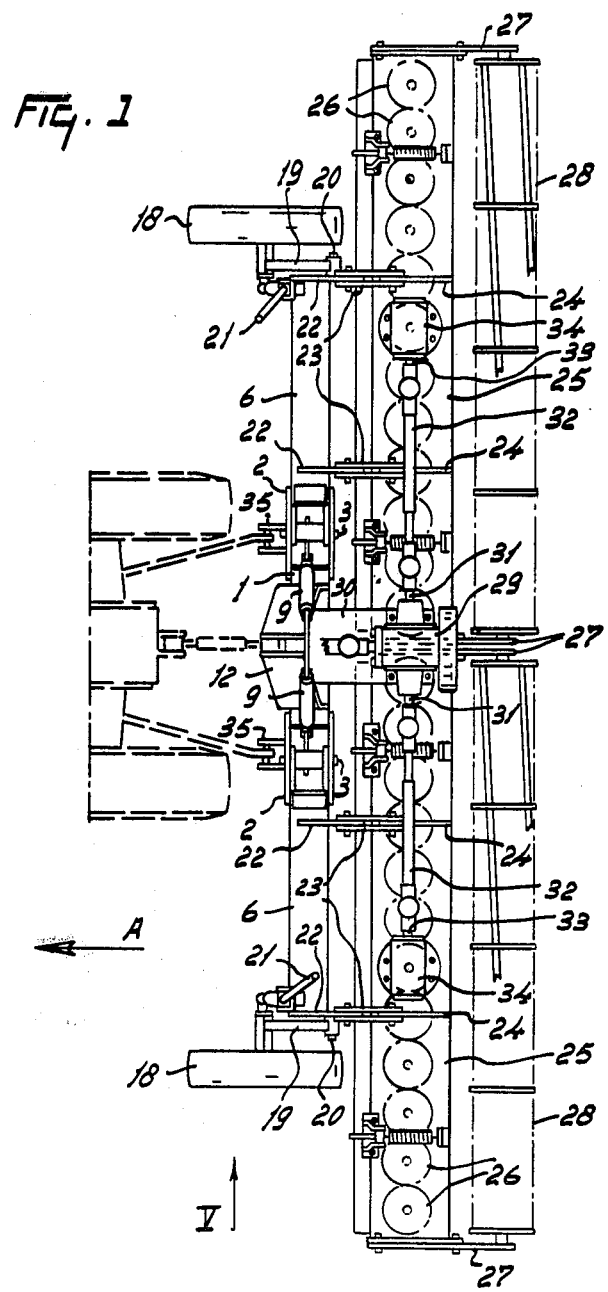

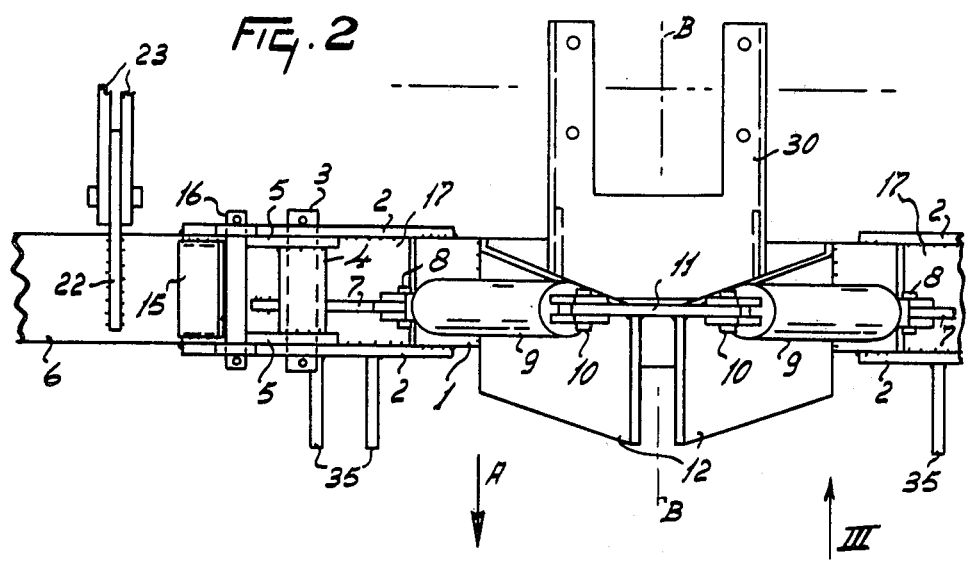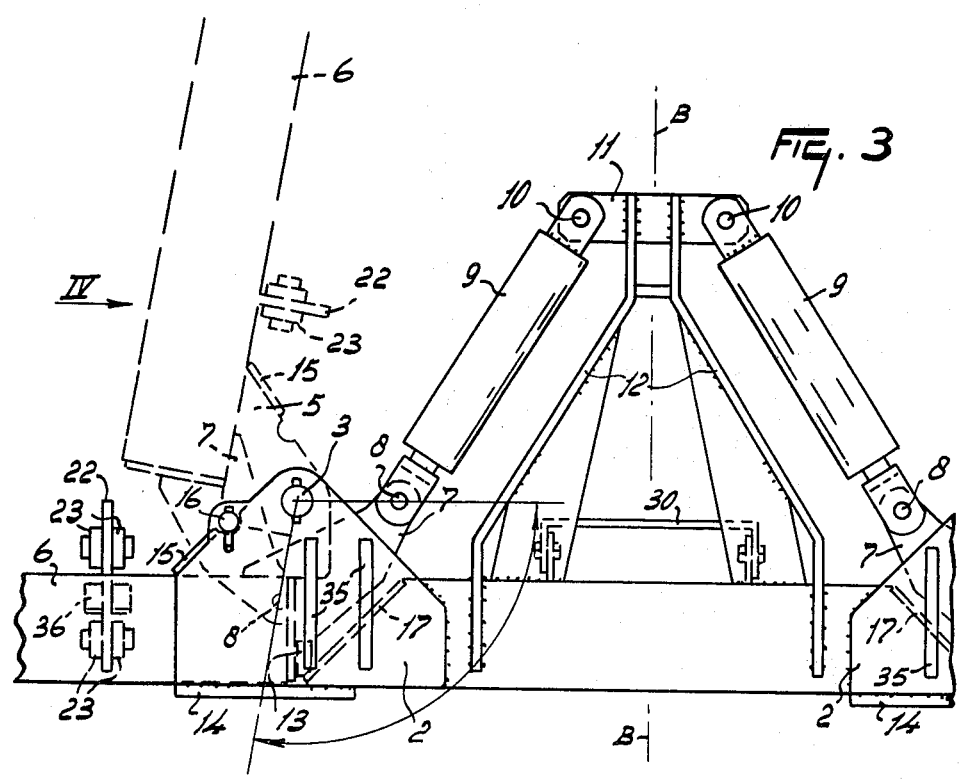

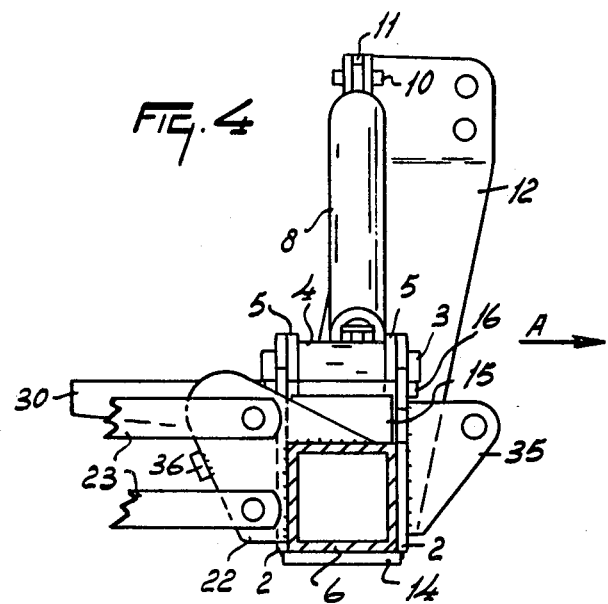
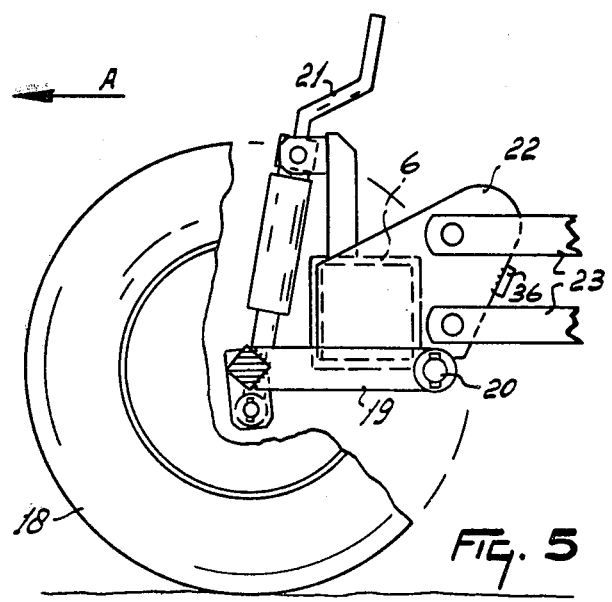

SOIL CULTIVATING IMPLEMENTS

SUMMARY OF THE INVENTION

This invention relates to soil cultivating implements or machines of the kind having a frame arranged to be connected to the three-point lifting device or hitch of a tractor or other vehicle, said frame being provided with at least one group of power drivable soil working members that are arranged in a row which extends substantially horizontally perpendicular, or at least transverse, to the intended direction of operative travel of the implement or machine when the latter is in operation. The term "implement or machine" will be shortened to "implement", or "implements" if plural, throughout the remainder of this specification for the sake of brevity.

Implements of this kind have their frames subjected to high forces when they are in use and, in order to resist deformation by these forces, known implements have been provided, amongst other things, with frameworks of beams to strengthen their frames. It is an object of the present invention to provide a frame for such implements which is materially simplified, as compared with known constructions, without sacrificing the required degree of strength to resist the potentially deforming forces to which it will be exposed when in use.

According to one aspect of the invention, there is provided a soil cultivating implement of the kind set forth, wherein the frame comprises a single carrier that extends substantially horizontally perpendicular, or at least transverse, to the intended direction of operative travel of the implement, said carrier having means for connection to the three-point lifting device or hitch of a tractor or other operating vehicle, and wherein the single carrier is provided with ground wheels and is located in advance of said group or groups of soil working members relative to said direction of operative travel.

According to another aspect of the invention, there is provided a soil cultivating implement comprising a carrier having means for connection to the three-point lifting device or hitch of a tractor or other operating vehicle, said carrier comprising at least one tiltable arm upon which soil working members are mounted and said arm being supported between two spaced cheek plates so as to be tiltable about an axis that is parallel or substantially parallel to the intended direction of operative travel of the implement, said axis being located adjacent the tops of the cheek plates, wherein, in a working position of the implement, the tiltably mounted end of the arm is disposed between the two cheek plates and is thus surrounded on at least three sides by those cheek plates and by a connecting piece which joins the cheek plates together beneath the arm.

For a better understanding of the invention, and to show how the same may be carried into effect, reference will now be made, by way of example, to the accompanying drawings, in which:

FIG. 1 is a plan view of a soil cultivating implement in accordance with the invention shown connected to the rear of an agricultural tractor, FIG. 2 is a plan view, to an enlarged scale, of a pivotal connection between parts of the implement of FIG. 1, FIG. 3 is an elevation to the same scale as that of FIG. 2 and as seen in the direction of an arrow III in FIG. 2, FIG. 4 is an elevation as seen in the direction of an arrow IV in FIG. 3, and FIG. 5 is a partial side elevation, to an enlarged scale, as seen in the direction indicated by an arrow V in FIG. 1.

DESCRIPTION OF THE PREFERRED EMBODIMENT

Referring to the accompanying drawings, the soil cultivating implement that is illustrated therein is basically in the form of a rotary harrow. The implement has a mobile frame which comprises a part 1 that extends substantially horizontally perpendicular, or at least substantially horizontally transverse, to the intended direction of operative travel of the implement that is indicated in several Figures of the drawings by an arrow A. The frame part 1 is in the form of a horizontally extending hollow frame beam that is of rectangular, and preferably square (as illustrated), cross-section, its opposite ends being provided with corresponding pairs of parallel but horizontally spaced apart upwardly projecting cheek plates 2 that act as supports. The two cheek plates 2 of each pair are, in fact, spaced apart from one another by the fore and aft thickness of the beam which affords the frame part 1 and it will be clear from the drawings (for example, FIG. 3) that said cheek plates 2, as well as projecting upwardly, project longitudinally beyond the respective opposite extremities of the beam 1. The centers of the two cheek plates 2 of each pair are approximately, although not exactly, in register, in the direction A, with a bevelled end plate 17 at the corresponding extremity of the frame part 1. A strong pivot pin 3 is mounted between the uppermost extremities of the two cheek plates 2 of each pair so as to extend substantially horizontally parallel to the direction A, each pivot pin 3 being turnably surrounded, between the corresponding pair of cheek plates 2, by a bearing sleeve 4 that carries two parallel lugs 5 at its opposite ends, alongside the respective plates 2. Each pair of lugs 5 is secured to the top, and at one end, of a corresponding hollow arm 6 which, in a working position of the implement, extends in substantially axial prolongation of the frame part 1, the latter lying substantially coaxially between the two hollow arms 6 under these circumstances. The cross-sectional shape and area of each hollow arm 6 is identical, or substantially identical, to that of the frame part 1. The lugs 5 are secured to the top of each hollow arm 6 in such positions that, in the working position of the implement that is shown in full lines in FIG. 3 of the drawings, plates at the inner ends of the arms 6 are located substantially vertically beneath the corresponding pivot pins 3.

The plate at the inner end of each hollow arm 6 carries a corresponding flat displacing arm 7 which, in the working position of the implement, is inclined upwardly and inwardly from said plate towards a vertical plane of substantial symmetry B—B of the implement which plane contains the midpoint of the frame part 1 and extends parallel to the direction A. Each displacing arm 7 tapers upwardly and inwardly towards the plane B—B from the plate at the inner end of the corresponding arm 6 in the working position of the implement and the end thereof which is remote from said arm 6 is pivotally connected by a pin 8 to a yoke at the lower and outer end of the piston rod of a corresponding hydraulic piston and cylinder assembly 9, the pivot pins 8 defining axes which are substantially horizontally parallel to those defined by the pivot pins 3. The uppermost "base" ends of the cylinders of the two assemblies 9 carry pairs of plates which are turnably connected by respective pivot pins 10 to the opposite ends of a transverse supporting plate 11, the latter being mounted at the top and rear, with respect to the direction A, of a coupling member or trestle 12 that is of substantially triangular configuration as seen in front or rear elevation and that is intended for use, in a manner that is generally known per se and that is illustrated only diagrammatically in FIG. 1 of the drawings, in coupling the frame of the implement to the upper adjustable-length lifting link of a three-point lifting device or hitch at the rear of an agricultural tractor or other operating vehicle. The two pivot pins 10 are in substantially parallel relationship with the pivot pins 3 and 8. It will be noted that, as viewed in the direction A or in the opposite direction, each hydraulic piston and cylinder assembly 9 is in parallel or substantially parallel relationship with one of the upwardly inclined sides of the basically triangular coupling member or trestle 12.

The bottoms of the two cheek plates 2 of each pair are rigidly coupled to one another by corresponding strip-shaped connecting pieces 14, each connecting plate 14 affording a stop which will prevent the corresponding arm 6 from turning downwardly beyond its required disposition in the working position of the implement in which that arm is in substantially coaxial relationship with the frame part 1. The connecting piece 14 which is visible towards the left-hand side of FIG. 3 can be seen to project inwardly towards the plane B—B beyond the plate at the inner end of the corresponding arm 6, the projecting portion being secured to the flat lower surface at the neighboring end of the frame part 1. Further stops 13 are provided between the two cheek plates 2 of each pair to engage the flat end plates of the arms 6 whe the implement is in its working position and to prevent the hollow arms 6 from turning downwardly about the pivot pins 3 beyond the positions in which they are in substantially coaxial relationship with the frame part 1 itself. Strips 15 rigidly interconnect edges of the two lugs 5 of each pair for strengthening purposes. The connecting pieces 14 and further stops 13 prevent the hollow arms 6 from turning too far downwardly about the pivot pins 3 in the working position of the implement and upward displacement of said arms 6 about the same pins 3 out of the working position is prevented by corresponding locking pins 16 that are entered horizontally in directions which are parallel to the direction A through aligned holes in the corresponding pairs of cheek plates 2, said locking pins 16 being lodged in arcuate recesses that are formed in edges of the lugs 5. It will be noted in FIG. 3 of the drawings that the bevelled end plates 17 of the frame part 1 are in parallel or substantially parallel relationship with lower and inner edges of the respective displacing arms 7 when the implement is arrayed in its working position.

Each pivot pin 8 is located at substantially the same horizontal level as is the corresponding pivot pin 3 when the implement is in its working position but, when each arm 6 is tilted upwardly about the corresponding pivot pin 3 into an inoperative or transport position, as shown in broken lines for one arm 6 in FIG. 3, each pivot pin 8 will be substantially, although not exactly, vertically beneath the corresponding pivot pin 3.

The outermost end of each hollow arm 6 has a corresponding ground wheel 18 connected to it in an upwardly and downwardly adjustable manner. To this end, each arm 6 carries a substantially horizontal stub shaft 20 at its outer end and at the bottom and rear thereof with respect to the direction A, a forwardly projecting arm 19 being upwardly and downwardly turnable about each stub shaft 20. The leading end of each arm 19 carries a substantially horizontal axle shaft upon which the wheel 18 concerned is rotatably mounted and it will be seen from FIGS. 1 and 5 of the drawings that each axle shaft is linked to a bracket on the top of the adjacent arm 6 by a screw-threaded assembly 21, which is of a construction that is known per se, each assembly 21 being adjustable in length by manually rotating a crank handle at its upper end. It will be apparent from FIG. 5 of the drawings that lengthening one of the assemblies 21 will turn the corresponding arm 19 downwardly about its stub shaft 20 and will thus bodily displace the ground wheel 18 concerned downwardly relative to the associated hollow arm 6. Clearly, shortening the same assembly 21 will have the opposite effect. This arrangement enables the ground wheels 18 to perform a maximum working depth control function for the operation of the implement.

Each arm 6 is provided, at a location adjoining its outer end and at a location spaced from its inner end, with two upwardly and rearwardly projecting supports 22 (FIGS. 4 and 5), each support 22 having upper and lower pairs of arms 23 pivotally connected to its opposite sides by upper and lower substantially horizontal pivot pins which extend substantially perpendicular to the direction A. The pairs of arms 23 extend rearwardly, with respect to the direction A, from the corresponding supports 22 and the rear ends thereof are pivotally connected by further pairs of parallel upper and lower pivot pins to support brackets 24 which are secured to the tops of corresponding hollow box-section frame portions 25. The implement thus comprises two of the hollow box-section frame portions 25 that, in the working position of the implement, are substantially horizontally aligned in a direction which is transverse, and usually substantially horizontally perpendicular, (as illustrated), to the direction A, each frame portion 25 being connected to a corresponding one of the two hollow arms 6 through the intermediary of a dual parallelogram linkage that includes the parts 22, 23 and 24.

Each hollow frame portion 25 rotatably supports a corresponding group of twelve rotary soil working members 26 which are arranged in a single row underneath said frame portion 25 and in parallel relationship with the length of that frame portion. Each rotary soil working member 26 is rotatable about the axis of a corresponding upwardly extending, or at least nonhorizontal, shaft, the positions of many of said shafts being diagrammatically illustrated in FIG. 1 of the drawings where, also, the construction of each soil working member 26 is illustrated only in the barest outline. In fact, although not visible in the drawings, each soil working member 26 is provided with a pair of rigid and diametrically opposed soil working tines that project downwardly into the ground when the implement is in use. The shaft of each member 26 is provided, inside the respective hollow frame portion 25, with a straight-toothed or spur-toothed pinion and the twelve pinions, therefor each frame portion 25 are successively in mesh with one another so that, when they are driven as will be described below, each soil working member 26 will resolve in the opposite direction to the or each of its immediate neighboring member or members.

Each hollow frame portion 25 is provided at its opposite ends with arms 27 which project rearwardly therefrom with respect to the direction A. The rear ends of the two arms 27 of each pair that correspond to one frame portion 25 carry substantially horizontally aligned bearings between which is freely rotatably mounted a soil working ground roller 28 of open cage-like construction, comprising a plurality of spaced elongate elements which are wound helically around the longitudinal axis of the roller skeletally to define the cylindrical ground-engaging curved surface thereof. Each roller 28 also comprises a plurality of regularly spaced apart strengthening support plates. The arms 27 are upwardly and downwardly turnable about axes which extend parallel to the transverse lengths of the hollow frame portions 25 relative to those frame portions, means being provided to enable each arm 27 to be retained in a chosen angular position about the axis concerned. The two rollers 28 can thus be moved bodily upwards and downwards relative to the corresponding frame portions 25 and can be retained at chosen levels with respect to those frame portions to control the maximum depth of penetration of the tines of the corresponding group of soil working members 26 into the ground which is possible.

A gear box 29 is mounted on a support platform 30 immediately to the rear of the coupling member or trestle 12, said support platform 30 being fastened to the frame part 1. The gear box 29 has a forwardly projecting splined or otherwise keyed rotary input shaft which is arranged to be placed in driven connection with a power take-off shaft at the rear of an agricultural tractor or other operating vehicle of the implement through the intermediary of a telescopic transmission shaft, which is of a construction that is known per se, having universal joints at its opposite ends. The rear end of such a shaft is shown diagrammatically in FIG. 1 of the drawings. The rotary input shaft of the gear box 29 is drivingly connected to two rotary output shafts 31 of the gear box, the connection including a change-speed gear that is mounted at the rear of the box 29, with respect to the direction A, to enable the output shafts 31, and thus the soil working members 26, to be driven at any chosen one of a number of different speeds without having to vary the speed of rotation of the drive that is applied to the rotary input shaft of the gear box 29. It is not necessary to describe nor illustrate the construction of the change-speed gear for the purposes of the present invention, said gear being of a basically known formation. The two output shafts 31, which project from the box 29 in opposite horizontal directions that are both perpendicular to the direction A, are linked to rotary input shafts 33 of corresponding gear boxes 34 through the intermediaries of telescopic transmission shafts 32 that have universal joints at their opposite ends. The two gear boxes 34 are mounted on top of the two hollow frame portions 25 and an output shaft of each of them is in the form of an upward extension, through the top of the respective frame portion 25, of the rotary shaft of one of the center pair of the twelve soil working members 26 which are carried beneath the frame portion 25 concerned.

The leading cheek plates 2, with respect to the direction A, of each pair carry corresponding pairs of apertured lugs 35, said lugs 35 being arranged to co-operate, in conjunction with corresponding pivot pins, with the free ends of the lower lifting links of a three-point lifting device or hitch carried by an agricultural tractor or other operating vehicle. The free end of the upper adjustable-length lifting link of the same three-point lifting device or hitch is arranged to co-operate, with the assistance of a pivot pin, with a coupling point at the apex of the substantially triangular coupling member or trestle 12.

In the use of a soil cultivating implement of the kind which has been described with reference to the accompanying drawings, said implement is disposed, for operation, as shown in FIGS. 1, 2, 4 and 5 and as shown in full lines in FIG. 3. This working position of the implement, in which the hollow arms 6 extend in substantial axial prolongation of the frame part 1 at opposite lateral sides of that frame part, is maintained by the connecting pieces 14, which act as stops, by the further stops 13 and by the locking pins 16, the latter being quickly and easily engageable and removable in a manner that is known per se. In fact, as can be seen in FIG. 3 of the drawings, each arm 6 is spaced by a short distance from the neighboring end of the frame part 1 in the working position of the implement, said end then being disposed substantially, if not exactly, vertically beneath the corresponding strong pivot pin 3. In the working position of the implement, the frame portion 1 and the two arms 6 together afford a single carrier for the rotary soil working members 26 and the two ground wheels 18 which ground wheels 18, it will be remembered, adjustably support the arms 6, and thus said single carrier, from the ground surface. This upward and downward adjustability of the single carrier relative to the ground surface enables a basic working depth of the implement to be established, before operation commences, a secondary adjustment for the maximum penetration into the soil of the tines of the members 26 being afforded by the upward and downward adjustability of the rollers 28 with respect to the frame portions 25 via the arms 27. The fact that the frame portions 25 are coupled to the single carrier via dual parallelogram linkages ensures that said frame portions 25 and their soil working members 26 can move upwardly and downwardly, during operation, relative to the single carrier, without significant tilting. The two frame portions 25 can move upwardly and downwardly, independently of each other, relative to the single carrier of the implement to enable the rotary soil working members 26 which they support to match undulations in the surface of the ground over which the implement is passing, and which it is working, during a soil cultivating operation.

It will readily be apparent that the implement has a broad working width which, in the case of the particular example that is being described, may be of the order of substantially six meters. This prevents the implement, in its working position, from passing through narrow gateways and the like and from being moved along public roads. Accordingly, when such a maneuver is required, the implement is brought to an inoperative transport position by first raising the three-point lifting device or hitch of the agricultural tractor or other vehicle to which the implement frame is connected, excessive downward displacements of the frame portions 25 and soil working members 26, relative to the single carrier, under these circumstances being prevented by the provision of stops 36 (FIG. 5) which stops block large downward angular displacements of the upper arms 23 of the two dual parallelogram linkages. Upon removing the two locking pins 16, and extending the piston rods of the two assemblies 9 from their cylinders by operating a hydraulic control positioned adjacent the driving seat of the operating tractor or other vehicle, the slightly curved displacing arms 7 will be turned between the respective pairs of cheek plates 2 and their interconnecting pieces 14, about the respective strong pivot pins 3, carrying with them the corresponding arms 6, to which they are secured, until a maximum displacement about each pivot pin 3 of substantially 100° has been attained. See FIG. 3 where this angle is shown between a substantially horizontal plane which, in the working position, contains the longitudinal axis of one of the pivot pins 3 and the corresponding pivot pin 8 and an upwardly inclined plane which contains the same axes when the illustrated arm 6 is upwardly tilted to its maximum extent into the inoperative transport position of the implement that is shown, for said illustrated one of the arms 6 in FIG. 3, in broken lines. The fully upwardly tilted positions of the two arms 6 correspond to the maximum extension of the piston rods of the two assemblies 9 from their cylinders which is possible. If desired, positive means (not shown) may be employed to maintain the arms 6 in an upwardly tilted position; for example, a chain releasably coupled between hooks on the tops of the two arms 6 or holes in the arms 7 to receive the pins 16.

It will readily be appreciated that, in its inoperative transport position, the width of the implement is very greatly reduced, as compared with its working position, so that the implement can readily pass through farm gateways, along public roads and the like, and be maneuvered in limited spaces. The displacing arms 7 and the pivot pins 8 which connect them to the piston rods of the hydraulic piston and cylinder assemblies 9 are located in the spaces that are formed between the respective pairs of cheek plates 2 and their interconnecting plates 14. This disposition, which is generally beneath the corresponding strong pivot pins 3 (in the working position of the implement) enables a strong and compact arrangement to be produced, particularly as regards the dispositions of the two assemblies 9. During operation, each of the arms 6 is effectively supported from the frame part 1 by the corresponding pair of cheek plates 2 and their interconnecting plate 14 so that the high forces which will often be exerted upon various parts of the implement during its operation can be resisted without deformation. When the implement has to be brought from its working position to its inoperative transport position, or vice versa, this can be activated quickly and easily by appropriate operation of the hydraulic piston and cylinder assemblies 9. Owing to the positions of the displacing arms 7 relative to the corresponding strong pivot pins 3, the arms 6 can be turned smoothly upwards and downwards about said pivot pins 3 without jerking, jolting or the like. To this end, it is preferred that the hydraulic piston and cylinder assemblies 9 should be double-acting assemblies to enable the arms 6 to be turned downwardly in a smooth manner, relative to the frame part 1, as well as upwardly as already described. It is noted, in this connection, that rigid and flexible ducts are required to interconnect the two hydraulic piston and cylinder assemblies 9 and the hydraulic system of the agricultural tractor or other vehicle which moves and operates the implement. The arrangement of these ducts is simple and basically known per se and, accordingly, they have been entirely omitted from the drawings to avoid unnecessarily complicating the latter.

Although certain features of the soil cultivating implement described and/or illustrated in the accompanying drawings will be set forth in the following claims as inventive features, it is emphasized that the invention is not necessarily limited to those features and that it includes within its scope all novel features of the implement which have been disclosed, both individually and in various combinations.

Having disclosed our invention, what we claim as new and novel to be secured by Letters Patent of the United States is:

1. A rotary harrow implement comprising frame means for mounting a transverse row of at least one group of power-driven soil working members mounted along the length of elongated portions of said frame means, a forward transverse carrier interconnected to said elongated portions to support said frame means, said carrier comprising a central part having connecting means attachable to the lifting device of a prime mover and a pair of spaced cheek plates at each end thereof, said central part having a width not substantially greater than that of said prime mover, a respective lateral arm connected to each pair of cheek plates by a pivot pin that defines a substantially horizontal axis and said lateral arm being interconnected to a respective said elongated frame portion so as to be tiltable with that portion upwardly about said pivot pin to an inoperative transport position and reduce the overall width of the implement, the inner end of said lateral arm being hinged to said cheek plates adjacent the upper sides thereof by said pivot pin and said inner end being fitted between said plates in the implement's working position, a displacing arm interconnecting said inner arm end to one end of a corresponding hydraulic piston and cylinder assembly and a pivotal connection between said displacing arm and said hydraulic assembly, said pivotal connection being located at substantially the same horizontal level as said pivot pin and inboard thereof when said lateral arm is in working position, said pivotal connection being displaceable by said assembly from a first location substantially the same level and inboard of said pivot pin to a second location substantially vertically beneath said pivot pin when said lateral arm together with respective frame portion is pivoted about the axis of rotation of said pivot pin and raised in its transport position, said connecting means comprising an upwardly extending triangular trestle that mounts a said hydraulic piston and cylinder assembly at opposite sides thereof, each said assembly extending substantially parallel to a respective upwardly inclined side of said trestle, the lower end of each said assembly being extendable to displace said pivotal connection with respect to said pivot pin from said first location to said second location when said lateral arm is raised to its transport position.

2. An implement as claimed in claim 1, wherein said cheek plates are recessed to receive a locking pin which locks the lateral arm in horizontal working position.

3. An implement as claimed in claim 1, wherein the upper end of said assembly is connected to the trestle adjacent the top thereof.

4. An implement as claimed in claim 1, wherein the inner end of said central part adjacent to said lateral arm is bevelled to accommodate said displacing arm in the working position of the implement.

5. An implement as claimed in claim 1, wherein each group of soil working members comprises soil working members that are rotatable about corresponding upwardly extending axes, the soil working members of each group being arranged in a row that extends substantially parallel to the longitudinal axis of said carrier in the working position.

6. An implement as claimed in claim 1, wherein the outer end of each lateral arm mounts a ground wheel which is laterally positioned to face said outer end.

7. An implement as claimed in claim 1 wherein said pivotal connection has a pivot axis which is in a position vertically beneath and slightly outboard of said axis of rotation of said pivot pin when the implement is in its transport position, said pivot axis moving relative to said axis of rotation through an obtuse angle when said lateral arm is raised from its working position to its transport position.

8. An implement as claimed in claim 7, wherein said obtuse angle is substantially 100°.

9. An implement as claimed in claim 7 comprising means for securing said lateral arms in said working positions and in said transport positions.

* * * * *